United States Patent
Fleury et al.

(10) Patent No.: US 9,852,230 B2
(45) Date of Patent: Dec. 26, 2017

(54) ASYNCHRONOUS MESSAGE PASSING FOR LARGE GRAPH CLUSTERING

(71) Applicant: GOOGLE INC., Mountain View, CA (US)

(72) Inventors: Eduardo Madeira Fleury, Santa Clara, CA (US); Seyed Vahab Mirrokni Banadaki, New York, NY (US); Nissan Hajaj, Emerald Hills, CA (US); Jerry Yi Ding, Los Altos, CA (US); Silvio Lattanzi, New York, NY (US)

(73) Assignee: Google LLC, Mountain View, CA (US)

( * ) Notice: Subject to any disclaimer, the term of this patent is extended or adjusted under 35 U.S.C. 154(b) by 209 days.

(21) Appl. No.: 14/145,127

(22) Filed: Dec. 31, 2013

(65) Prior Publication Data

US 2015/0006606 A1    Jan. 1, 2015

Related U.S. Application Data

(60) Provisional application No. 61/841,334, filed on Jun. 29, 2013.

(51) Int. Cl.
*G06F 17/30* (2006.01)
*G06F 9/54* (2006.01)
*G06Q 10/06* (2012.01)

(52) U.S. Cl.
CPC ........ *G06F 17/30958* (2013.01); *G06F 9/546* (2013.01); *G06Q 10/06* (2013.01); *G06F 2209/548* (2013.01)

(58) Field of Classification Search
CPC ..................................................... H04L 67/10
(Continued)

(56) References Cited

U.S. PATENT DOCUMENTS 7,761,448 B2    7/2010 Meyerzon et al.
8,631,094 B1    1/2014 Alpert et al.
(Continued)

FOREIGN PATENT DOCUMENTS

WO    2007/041120 A1    4/2007

OTHER PUBLICATIONS

Afrati et al., "Map-Reduce Extensions and Recursive Queries", EDBT, ACM, Mar. 22-24, 2011, 8 pages.
(Continued)

*Primary Examiner* — Vivek Srivastava
*Assistant Examiner* — Sibte Bukhari
(74) *Attorney, Agent, or Firm* — Brake Hughes Bellermann LLP (57) ABSTRACT

Systems and methods for sending asynchronous messages include receiving, using at least one processor, at a node in a distributed graph, a message with a first value and determining, at the node, that the first value replaces a current value for the node. In response to determining that the first value replaces the current value, the method also includes setting a status of the node to active and sending messages including the first value to neighboring nodes. The method may also include receiving the messages to the neighboring nodes at a priority queue. The priority queue propagates messages in an intelligently asynchronous manner, and the priority queue propagates the messages to the neighboring nodes, the status of the node is set to inactive. The first value may be a cluster identifier or a shortest path identifier.

26 Claims, 6 Drawing Sheets

(58) Field of Classification Search
USPC .......................................................... 709/201
See application file for complete search history.

(56) References Cited

U.S. PATENT DOCUMENTS

| | | | |
|---|---|---|---|
| 2003/0033582 | A1 | 2/2003 | Klein et al. |
| 2005/0073962 | A1 | 4/2005 | Zabele et al. |
| 2005/0088965 | A1 | 4/2005 | Atlas et al. |
| 2007/0297332 | A1 | 12/2007 | Broberg et al. |
| 2008/0288580 | A1 | 11/2008 | Wang et al. |
| 2009/0007127 | A1 | 1/2009 | Roberts et al. |
| 2009/0210489 | A1 | 8/2009 | Deb et al. |
| 2009/0316697 | A1 | 12/2009 | Dakshinamoorthy et al. |
| 2010/0017368 | A1 | 1/2010 | Mao et al. |
| 2010/0083194 | A1 | 4/2010 | Bagherjeiran et al. |
| 2010/0228849 | A1* | 9/2010 | Moore .................. G06F 9/54 709/224 |
| 2011/0066649 | A1* | 3/2011 | Berlyant ............ G06F 9/5066 707/770 |
| 2013/0024479 | A1 | 1/2013 | Gong et al. |
| 2014/0074987 | A1* | 3/2014 | Martz ................ G06F 21/6272 709/219 |

OTHER PUBLICATIONS

Chakrabarti et al., "R-MAT: A Recursive Model for Graph Mining", In Fourth Siam International Conference on Data Mining (SDM), 2004, 5 pages.
Chang et al., "Bigtable: A Distributed Storage System for Structured Data", In OSD/'06: Seventh Symposium on Operating System Design and Implementation, Google, Inc., 2006, 14 pages.
Suri, et al., "Counting Triangles and the Curse of the Last Reducer", Proceedings of the 20th international conference on World Wide Web, Mar. 28-Apr. 1, 2011, pp. 607-614.
Cohen, "Graph Twiddling in a MapReduce World", Computing in Science and Engineering, 11(4), Jul. 2009, pp. 29-41.
Valiant, et al., "A Bridging Model for Parallel Computation", Communications of the ACM, vol. 33 Issue 8, Aug. 1990, pp. 103-111.
Goodrich et al., "Sorting, Searching, and Simulation in the MapReduce Framework", Lecture Notes in Computer Science, vol. 7074, 2011, 374-383 pages.
Johnson et al., "Connected Components in O(log3/2n) Parallel Time for the CREW PRAM", J. Comput. Syst. Sci., 54(2), 1997, 43 pages.
Kang et al., "PEGASUS: A Peta-Scale Graph Mining System Implementation and Observations", The Ninth IEEE International Conference on Data Mining, Dec. 6-9, 2009, pp. 229-238.
Karger et al., "Fast Connected Components Algorithms for the EREW PRAM", Proceeding SPAA '92 Proceedings of the Fourth Annual ACM Symposium on Parallel Algorithms and Architectures, 1992, pp. 373-381.
Karloff et al., "A Model of Computation for MapReduce", Proceeding SODA '10 Proceedings of the Twenty-First Annual ACM-SIAM Symposium on Discrete Algorithms, 2010, pp. 938-948.
Krishnamurthy et al., "Connected Components on Distributed Memory Machines", In Parallel Algorithms: 3rd DIMACS Implementation Challenge, 1994, 21 pages.
Kwak et al., "What is Twitter, A Social Network or a News Media?", Proceedings of the 19th International Conference on World Wide Web, Apr. 26-30, 2010, pp. 591-600.
Low et al., "Distributed GraphLab: A Framework for Machine Learning and Data Mining in the Cloud", Proceedings of the VLDB Endowment, vol. 5 Issue 8, Apr. 2012, pp. 716-727.
Malewicz et al., "Pregel: A System for Large-Scale Graph Processing", Proceedings of the 2010 ACM SIGMOD International Conference on Management of Data, 2010, pp. 135-146.
Plimpton et al., "MapReduce in MPI for Large-Scale Graph Algorithms", Parallel Computing, vol. 37, Issue 9, Sep. 2011, pp. 610-632.
Rastogi et al., "Finding Connected Components in Map-Reduce in Logarithmic Rounds", Data Engineering (ICDE), 2013 IEEE 29th International Conference, Apr. 8-12, 2013, pp. 50-61.
Seidl, et al., "CC-MR—Finding Connected Components in Huge Graphs with MapReduce", EMCL PKDD 2012, Part I, LNCS 7523, 2012, 16 pages.
International Search Report and Written Opinion for PCT Patent Application No. PCT/US2014/044642, dated Oct. 8, 2014, 13 pages.
Banerjee et al., "Hybrid Algorithms for List Ranking and Graph Connected Components", IEEE, Dec. 18, 2011, 10 pages.
Gazit et al., "An Optimal Randomized Parallel Algorithm for Finding Connected Components in a Graph", IEEE, Oct. 27, 1986, pp. 492-501.
Nuutila et al., "On Finding the Strongly Connected Components in a Directed Graph", vol. 49, No. 1, Jan. 14, 1994, pp. 9-14.
Koubek et al., "Parallel Algorithms for Connected Components in a Graph", Sep. 9, 1985, pp. 208-217.
Seidl et al., "CC-MR—Finding Connected Components in Huge Graphs with MapReduce", Sep. 24, 2012, pp. 458-473.
Abramowski et al., "Searching Connected Components in Very Large Grid Graphs", Jun. 17, 1986, pp. 118-130.
Rastogi et al., "Finding Connected Components in Map-Reduce in Logarithmic Rounds", ICDE Conference 2013, pp. 50-61.
Office Action for European Patent Application No. 14744684.3, dated Jun. 30, 2017, 7 pages.

\* cited by examiner

ASYNCHRONOUS MESSAGE PASSING FOR LARGE GRAPH CLUSTERING

RELATED APPLICATION

This application claims priority under 35 U.S.C. §119 to Provisional Patent Application Ser. No. 61/841,334, entitled "ASYNCHRONOUS MESSAGE PASSING FOR LARGE GRAPH CLUSTERING" filed on Jun. 29, 2013. The subject matter of this earlier filed application is hereby incorporated by reference.

BACKGROUND

Figure 2:
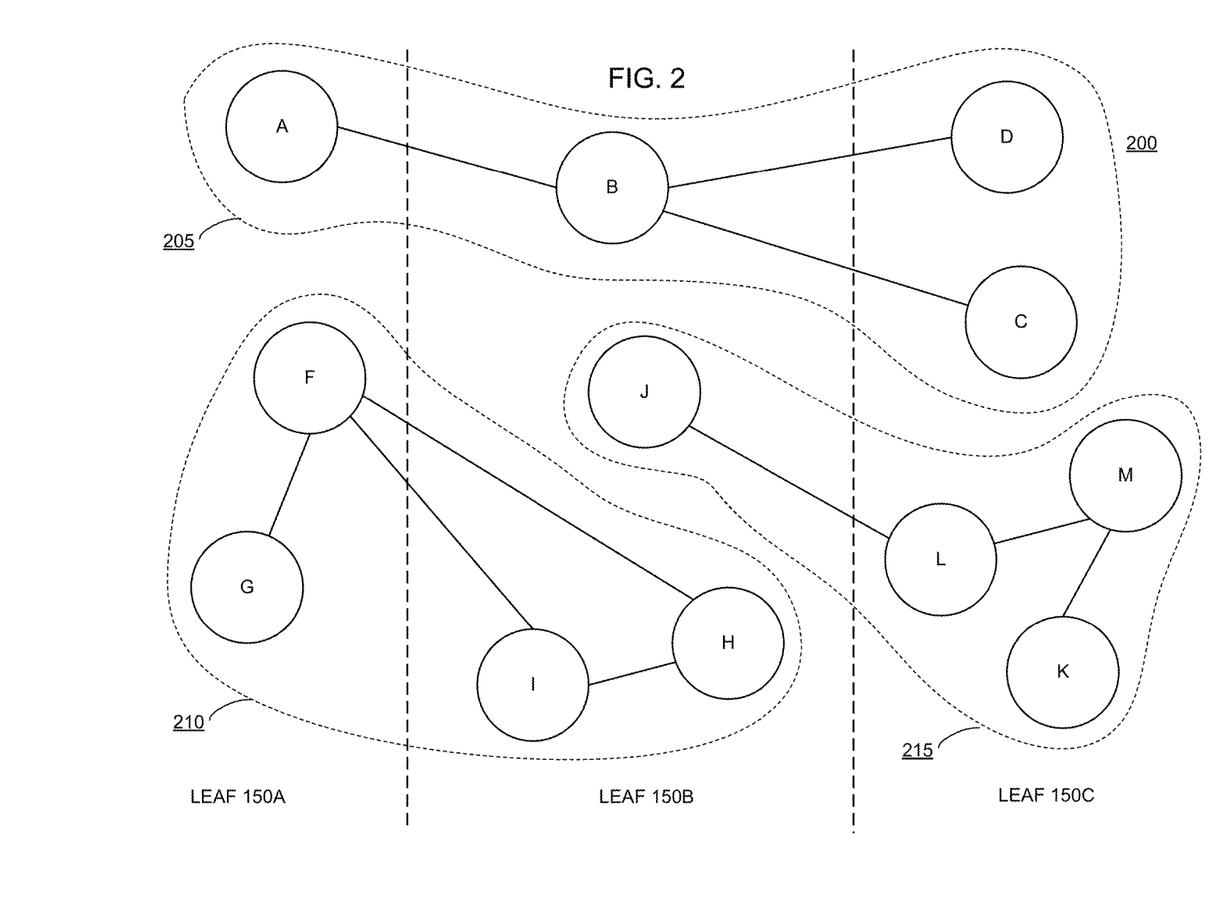
FIG. 2 illustrates an example graph distributed across three leaves and including three clusters.

Graphs are a basic modeling tool to model social, communication, and information networks. A graph G(V, E) consists of a set of nodes V, and a set of edges $E \epsilon V^2$ where each edge connects two nodes in the graph. In many applications, analysis is performed on large graphs that do not fit on one machine. Consequently, the graph is stored in several machines and mined in a distributed manner, for example by applying distributed programming tools like Map-Reduce or Hadoop. A basic analysis tool for graphs is to compute connected components of the graph. A connected component of a graph G(V,E) is a maximal set of nodes that can be reached from each other via sequences of edges of the graph. Computing connected components of graph G results in a partitioning of the nodes V into one of several clusters, where each cluster is a connected component. For example, FIG. 2 illustrates a graph G with three connected components. Connected component 205 includes nodes A, B, C, and D, connected component 210 includes nodes F, G, I, and H, and connected component 215 includes nodes J, K, L, and M. The connected components may also be referred to as a cluster of nodes.

Computing connected components in graphs is a basic tool for computing coherent clusters of nodes and also to perform hierarchical clustering. But computing clusters of nodes distributed across multiple machines can be time and cost prohibitive as the running time of the hashing functions are dependent on the size of the graph, the number of messages sent between machines during the rounds of Map-Reduce, and the number of rounds of Map-Reduce performed. It is a challenge is to compute connected components for a large graph in a small number of rounds of Map-Reduce.

SUMMARY

Implementations provide an asynchronous message passing framework for computing connected components in a large distributed graph. The asynchronous message passing frameworks utilizes a priority queue to pass messages between nodes. Each node is able to perform its share of the computations and send messages regardless of the state of its peers, unlike synchronous message passing frameworks such as Map-Reduce and Hadoop. Using the priority queue allows the system to send blocks of requests between distributed computing devices for more efficient processing. The framework also uses a smaller memory footprint because each node tracks only a minimum identifier for a potential connected component, rather than a set of possible identifiers. This also makes message sizes smaller. Because messaging is asynchronous, each node may independently checkpoint its state and can restart after failure at the last checkpointed state. Recovering from failure is also more efficient because the number of messages that need to be replayed to recover a single machine is significantly less than synchronous message passing frameworks.

One aspect of the disclosure can be embodied in a system that includes distributed computing devices represented by leaf servers and memory storing a graph of nodes and edges, the graph being distributed across the leaf servers. A leaf server can include memory storing a cluster identifier for each node assigned to the leaf server, at least one processor, and memory storing instructions that, when executed by the at least one processor, cause the leaf server to send asynchronous messages between neighboring nodes, the messages comprising an asynchronous message from a first node to a second node including the cluster identifier for the first node, wherein sending the asynchronous message is triggered by an update to the cluster identifier. The graph may include more than one billion nodes.

The system can include one or more of the following features, for example, the memory may further store instructions that, when executed by the at least one processor, cause the leaf server to propagate the message to the second node and compare the cluster identifier from the message with the cluster identifier for the second node to determine whether to update the cluster identifier for the second node. When it is determined that the cluster identifier of the second node is to be updated, the instructions may cause the leaf server to update the cluster identifier for the second node with the cluster identifier from the message and generate messages to neighboring nodes of the second node, the messages including the updated cluster identifier. In such implementations, the leaf server may set a status of the second node to active as part of the updating and set the status of the second node to inactive in response to propagation of the messages to neighboring nodes. In some such implementations the instructions may further cause the leaf server to store the updated cluster identifier in persistent memory.

As another example, the leaf server may also include a priority queue engine that propagates messages between neighboring nodes. In such an implementation, the priority queue engine may be capable of bundling together messages directed to nodes on another leaf server before propagation of the messages and/or of intelligently skipping redundant messages rather than propagating the messages. As another example, the cluster identifier may represent the smallest identifier seen by the first node and the cluster identifier for the second node is to be updated when the cluster identifier from the message is smaller than the cluster identifier for the second node. In another example, at least one leaf server includes a plurality of processors and the at least one leaf server uses the plurality of processors to concurrently send multiple messages departing from nodes and to receive multiple messages arriving at nodes.

Another aspect of the disclosure can be embodied in a method that includes propagating, using at least one processor, messages sent between nodes in a distributed graph in an asynchronous manner, the messages including respective cluster identifiers. In response to a first node of the distributed graph receiving one of the messages, the method may also include comparing a cluster identifier from the received message with a cluster identifier for the first node to determine whether to update the cluster identifier for the first node and, when it is determined that the cluster identifier of the first node is to be updated, updating the cluster identifier for the first node with the cluster identifier from the message and generating messages to neighboring nodes of the first node, the messages including the updated cluster identifier.

The method can include one or more of the following features. For example, a priority queue engine may control the propagating. The priority queue engine may propagate the messages in an arbitrary manner rather than a first-in-first-out or last-in-last-out manner. In some implementations, nodes in the distributed graph are assigned to one of a plurality of leaf servers with each leaf server having a respective priority queue engine, the priority queue engine being one of the respective priority queue engines, and wherein the priority queue engine bundles messages directed to nodes assigned to a remote leaf server of the plurality of leaf servers prior to propagating the messages. Propagating the messages at a particular leaf server can continue despite a failure of another leaf server.

As another example, the method may further include storing the updated cluster identifier in persistent memory and, in response to the first node determining that it experienced a failure, obtaining the cluster identifier from the persistent memory and generating messages to the neighboring nodes of the first node, the messages requesting a cluster identifier from the respective neighboring nodes. In some implementations, the cluster identifier for the first node represents the smallest identifier seen by the first node and the cluster identifier for the first node is to be updated when the cluster identifier from the message is smaller than the cluster identifier for the first node.

As another example, the method may also include setting a status of the first node to active as part of the updating, and setting the status of the first node to inactive in response to propagating the messages to the neighboring nodes. In some implementations, the propagating is performed without regard to respective states of the nodes in the distributed graph.

In another aspect, a method includes receiving, using at least one processor, at a node in a distributed graph, a message with a first value and determining, at the node, that the first value replaces a current value for the node. Responsive to the determining, the method also includes setting a status of the node to active and sending messages that include the first value to neighboring nodes. The method may also include receiving, using the at least one processor, the messages to the neighboring nodes at a priority queue, wherein the priority queue propagates messages in an intelligently asynchronous manner, and wherein when the message is propagated to the neighboring nodes, the status of the node is set to inactive.

The method may include one or more of the following features, for example, the node may be a first node and the method may further include receiving, at the first node, a request from a second node for messages sent after a first time and determining, at the first node, whether the messages to neighboring nodes were sent after the first time. When the messages were sent after the first time, the method includes re-sending the message to the second node and when the messages were not sent after the first time, the method includes ignoring the request. In some implementations the second node sends the request after recovering a current value for the second node from a checkpoint. As another example, the first value and the current value may be cluster identifiers or the first value and the current value may be shortest path identifiers.

Another aspect of the disclosure can be embodied on a computer-readable medium having recorded and embodied thereon instructions that, when executed by a processor of a computer system, cause the computer system to perform any of the methods disclosed herein.

One or more of the implementations of the subject matter described herein can be implemented so as to realize one or more of the following advantages. As one example, the system may reduce the time and cost of performing operations on a large distributed graph, such as determining connected components in a graph, computing the shortest path between two nodes, search, etc. Implementations not only reduce the number of messages sent, but also reduce the size of the messages. Also, because message passing is asynchronous, the processing time is reduced as nodes need not wait for other nodes to finish processing. The asynchronous nature also permits efficient recovery when a node or leaf stops responding temporarily, making the system robust under frequent failures. To confirm the fault-tolerance property of the system, an experiment was conducted in which a subset of machines were made to artificially fail periodically over time and the increase in total running time and number of messages exchanged was recorded. Surprisingly, the running times increased only 10% to 20% with a 20% machine failure rate. Even with a 70% failure rate, the running time was multiplied by a factor of 2, demonstrating the high level of fault tolerance achieved with implementations. Connected component generation is a building block for graph clustering, which can be used in various fields, such as network analysis, vision and image processing, machine learning, knowledge discovery, search, etc.

The details of one or more implementations are set forth in the accompanying drawings and the description below. Other features will be apparent from the description and drawings, and from the claims.

BRIEF DESCRIPTION OF DRAWINGS

Like reference symbols in the various drawings indicate like elements.

DETAILED DESCRIPTION

Figure 1:
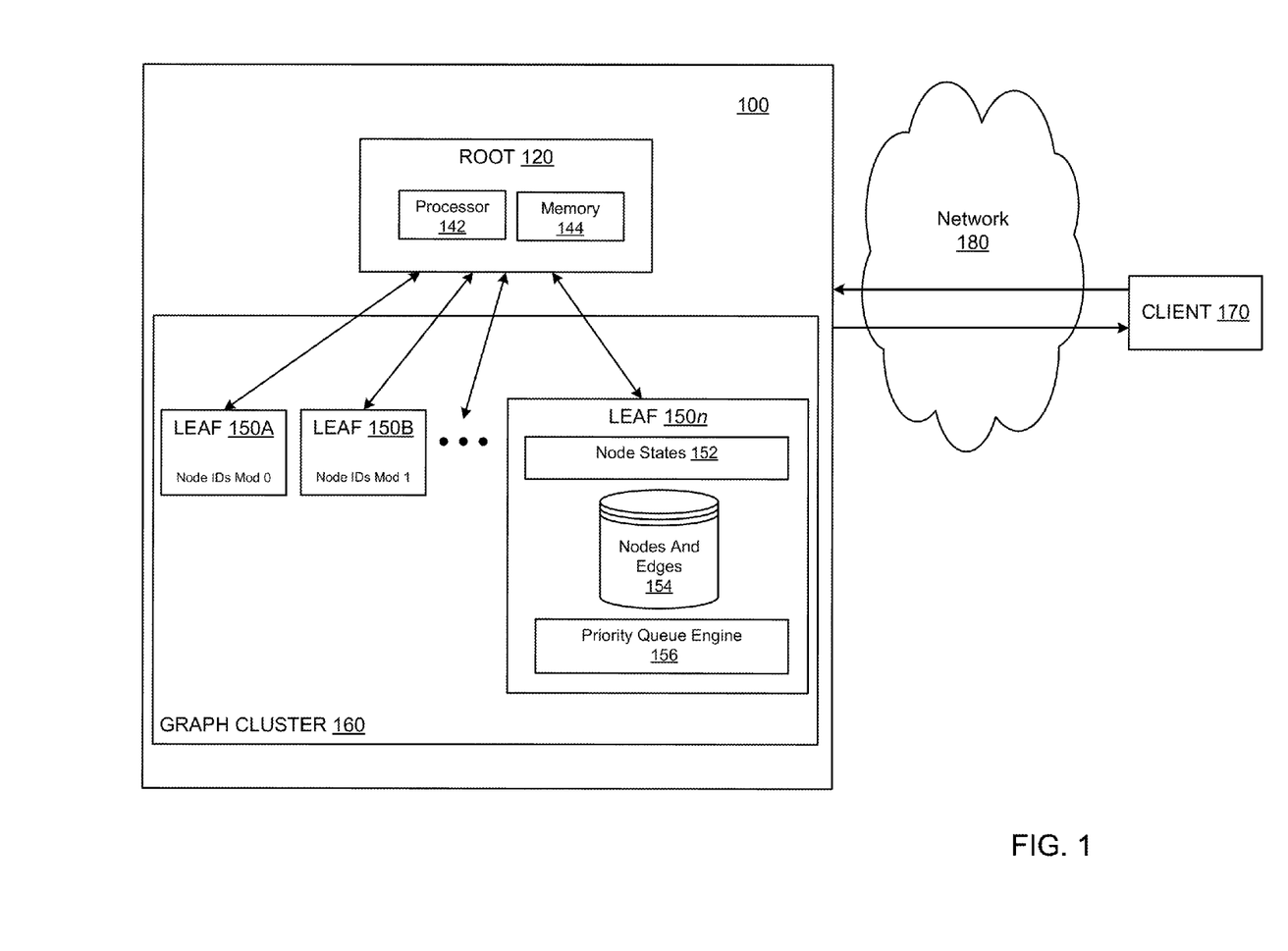
FIG. 1 illustrates an example system in accordance with the disclosed subject matter.
Figure 6:
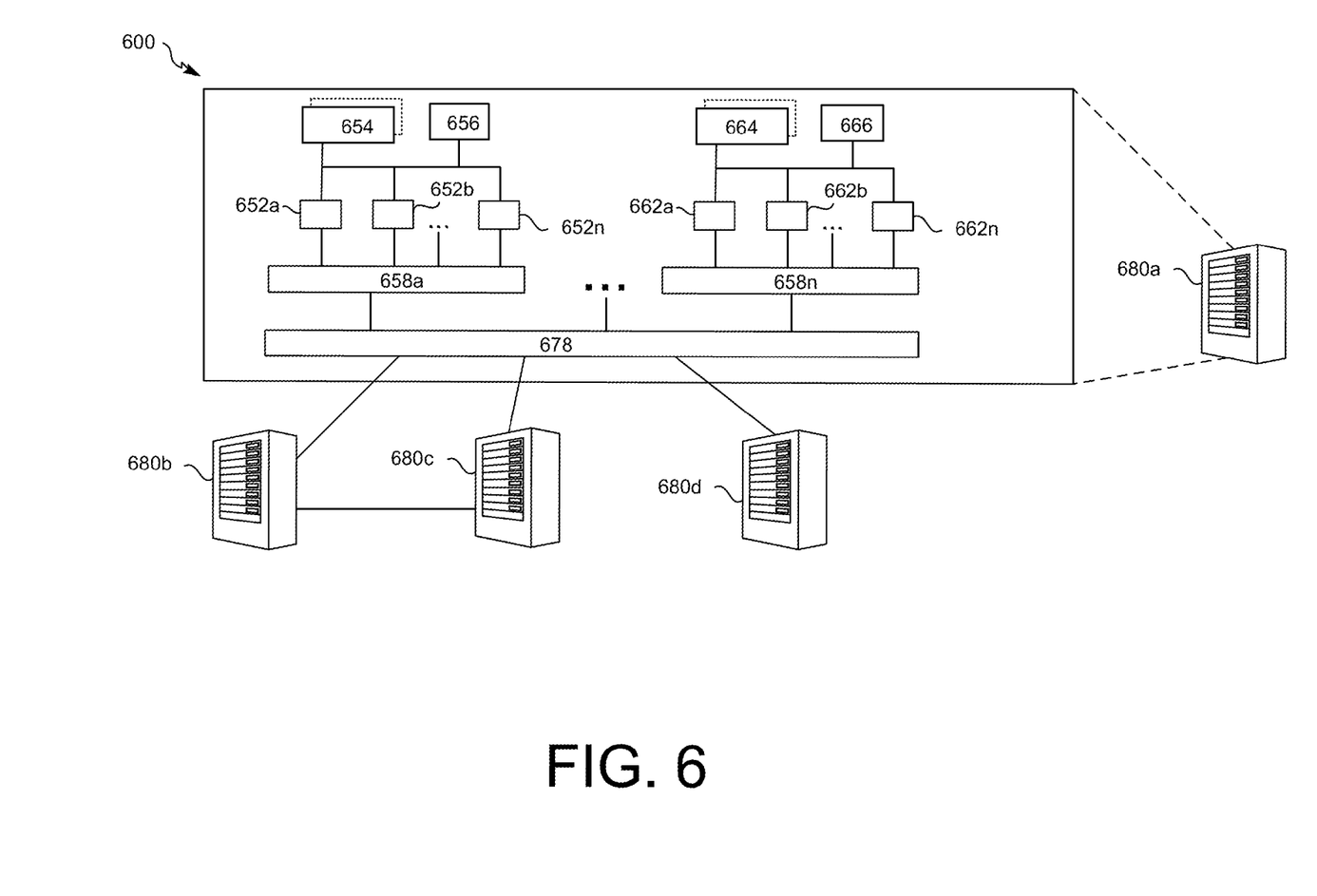
FIG. 6 shows an example of a distributed computer device that can be used to implement the described techniques.

FIG. 1 is a block diagram of a distributed graph system 100 in accordance with an example implementation. The system 100 may be used to calculate connected components of a large distributed graph using the techniques described herein. The graph system 100 may include root 120 and graph cluster 160. Root 120 and graph cluster 160 may be computing devices that take the form of a number of different devices, for example a standard server, a group of such servers, or a rack server system. In some implementations, the root 120 and the graph cluster 160 may be distributed systems implemented in a series of computing devices, such as a group of servers. In some implementations, the servers may be organized into a tree structure, with at least a root server 120 and leaf servers 150A to 150*n*. In some implementations (not shown), the tree may include intermediate servers, so that there are one or more layers between the root 120 and the leaf servers 150A to 150*n*. The root 120 and graph cluster 160 may be examples of computer device 600, as depicted in FIG. 6.

The graph system 100 illustrated in FIG. 1 operates over a large graph with, for example, billions of nodes. The root 120 may include one or more servers that operate with the graph cluster 160 to perform operations on the data graph represented by nodes and edges 154. The nodes and edges 154 may be stored in one or more data structures that represent each node of the graph and an adjacency list for each node. The data structure may also represent other information, for example the attributes of the edges that link a node to its neighbors in the adjacency list. The root 120 may include one or more servers that receive commands or requests from a requester, such as client 170. The root 120 may initiate and monitor calculations performed on the graph and may manage the results of the calculations. In some implementations, the root 120 may facilitate searches and queries on the graph. The root 120 may also store instructions in memory 144 that, when executed by the hardware processor 142, cause the system 100 to perform operations. For example, the root 120 and/or graph cluster 160 may include logic to process messages sent from one node to its neighbors.

System 100 may also include a graph cluster 160. Graph cluster 160 may be a collection of distributed computing devices each with its own hardware processor and memory. The number of computing devices that comprise graph cluster 160 can vary. The graph cluster 160 may be divided into one or more leaf servers, such as leaf 150A, leaf 150B, leaf 150n, with n representing any positive integer. A leaf server may be a logical division of nodes in the graph, with each graph node being assigned to a leaf server. Thus, a leaf server may correspond to one computing device, or a leaf server may be a logical computing device and may share a physical computing device with other leaves. In some implementations, a node's assigned leaf may change as the graph is updated, making leaf assignments flexible. The root 120 may determine which nodes are assigned to each leaf as the nodes are added to the graph or updated.

The root 120 may route processing requests to the leaf servers and act as the primary means of coordination between the leaves at processing time. In some implementations, leaves may send messages directly to each other rather than going through the root 120. The messages may be messages from a node in the graph to its neighbors. In addition to the leaf servers 150, the graph cluster 160 may include one or more layers of intermediate servers between the root node 120 and the leaf servers 150, but are not shown in FIG. 1 for the sake of brevity. Thus, for example, an intermediate server may be associated with, for example, 20 leaf servers. The intermediate server may be connected directly to the root 120, or there may be one or more additional layers between the intermediate server and the root 120. Thus, although FIG. 1 shows communications directly between the root 120 and leaf servers 150, it is to be understood that intermediate devices may be used to direct communications and aggregate results using known methods, such as remote procedure calls. The root, intermediate, and leaf servers that make up the tree may, collectively, be referred to as the graph.

Each of the leaf servers 150 that make up graph cluster 160 can include node states 152 and nodes and edges 154. A state for a node may be used in calculating connected components for the graph and may include a status and a cluster identifier. The cluster identifier identifies the cluster, or potential connected component, that a node belongs to. During the calculation of connected components, the cluster identifier in the state of a node V may change, but it generally represents the smallest identifier that the node V has seen. This is similar to a Hash-Only-Min hashing algorithm. Alternatively, in some implementations the identifier may represent an identifier for the node with the greatest identifier received. At the conclusion of the computation, the state for a node will contain the identifier of the connected component to which the node belongs. The state of a node may not be altered by messages sent between nodes, only by the node itself or the priority queue engine 156. In addition to the identifier, each node state may include a status. The status may indicate whether the node is active or inactive. An active status indicates that the identifier in the state has changed and the node needs to send a message with the new identifier to its neighbors. After the message has been propagated the state status may be changed to inactive. When all nodes in the graph are inactive, and all messages have been sent by the priority queue engine 156, the system has computed the connected components for the graph. At this point the state identifier for each node contains the identifier of the connected component to which the node belongs.

Each leaf server 150 may also include a priority queue engine 156. Messages sent between nodes may be handled by the priority queue engine 156. The priority queue engine 156 may track which messages have been sent and which still need to be sent, but does not need to send messages in the order at which they arrive. In some implementations, the priority queue engine 156 may arbitrarily choose which message to propagate next. In some implementations, the priority queue engine 156 may bundle messages destined for other leaf servers together, and send the bundled messages together. This makes messaging more efficient. Furthermore, if a leaf is not responding, the priority queue engine 156 can keep track of messages not successfully acknowledged so that these messages can be resent when the leaf begins responding again. In some implementations, when the priority queue engine 156 propagates the messages from a node it may set the status of the node to inactive.

Graph system 100 may be in communication with clients 170 over network 180. The network 180 may be for example, the Internet or the network 180 can be a wired or wireless local area network (LAN), wide area network (WAN), etc., implemented using, for example, gateway devices, bridges, switches, and/or so forth. Via the network 180, the system 100 may communicate with and transmit data to/from clients 170 or other computing devices.

Figure 3:
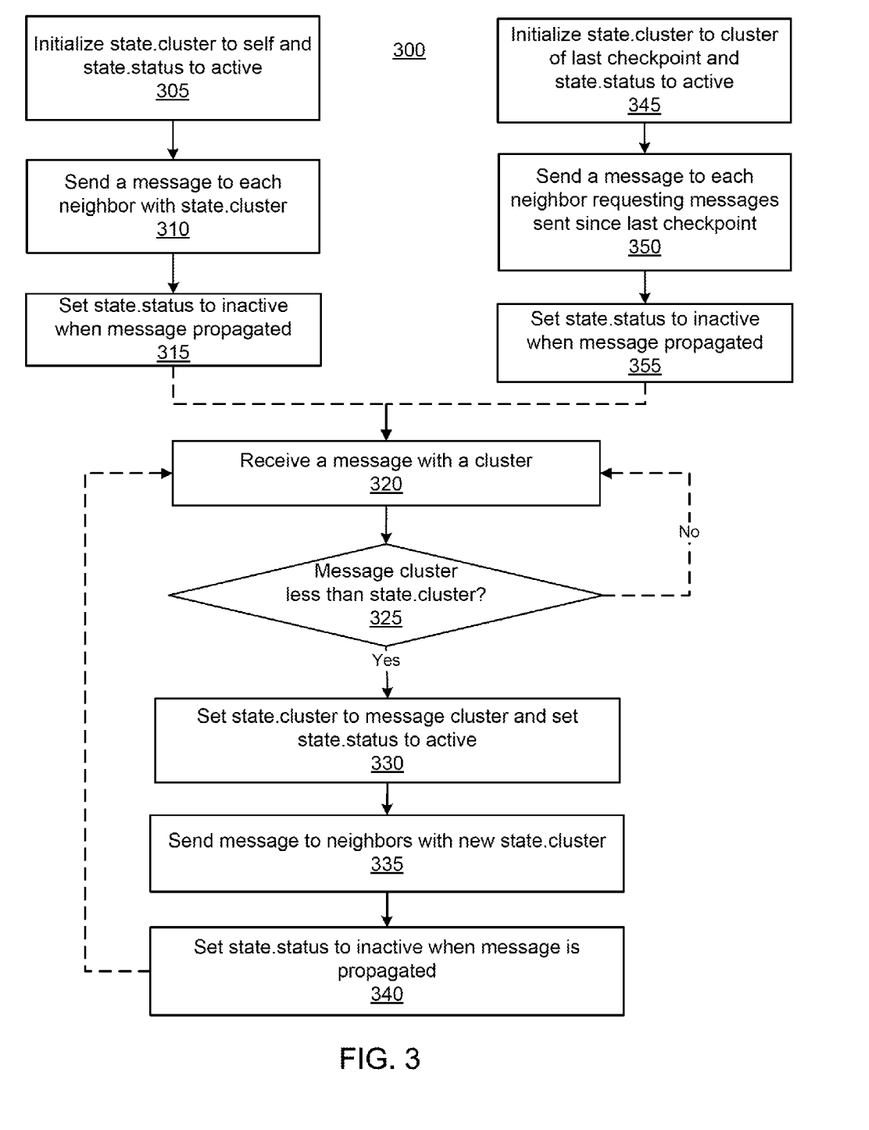
FIG. 3 illustrates a flow diagram of an example process for computing connected components of a large distributed graph.

FIG. 3 illustrates a flow diagram of an example process 300 for computing connected components of a large distributed graph. The process 300 shown in FIG. 3 may be performed by a graph system distributed across multiple computing devices, such as graph system 100 of FIG. 1. The process 300 may speed the calculation of connected components in a distributed graph by using an asynchronous message passing protocol to calculate the cluster each node belongs to. A root, such as root 120, may initiate process 300 to determine which cluster each node in the graph belongs to. Process 300 is described for one node, but it is understood that the process 300 occurs for all nodes simultaneously. Furthermore, while FIG. 3 illustrates a cluster identifier being passed in the message, the message may pass other values, such as a shortest path identifier.

The process may begin with the system initializing the state of the node (305). The initial state for a node will be an active status and an identifier set equal to the identifier of the node. Because each node is active, it will send a message to each neighbor, the message including its state identifier (310). This message may be sent to the priority queue and distributed by the priority queue engine. Any known or later developed method of sending messages between nodes may be used. Once the message is propagated, the status of the node may change from active to inactive (315). In some implementations this can be done by the priority queue engine.

The node may then enter a waiting stage, represented by the dashed line in FIG. 3. The node is waiting for a message with a cluster identifier. If no message ever arrives, the node will remain in the waiting stage. When it receives such a message (320) it may compare the value, e.g., the cluster identifier, from the message with the value, e.g., the cluster identifier, in its state (325). If the message cluster identifier is greater than or equal to the identifier in the state (325, No), the node does nothing and continues waiting for another message. While waiting the node has an inactive status. If the message cluster identifier is less than the identifier in the state (325, Yes), the node may change its status to active and change the cluster identifier in its state to the message cluster identifier (330). Because the node's status is active, it sends a message to its neighbors, via the priority queue (335). The message contains the updated cluster identifier received in the message. When the message is propagated by the priority queue engine, the status may change back to inactive (340). The node then returns to a waiting stage, waiting for another message. The system may also checkpoint the states of the nodes at various points while nodes are performing process 300. Checkpointing the state may cause the system to store the states for the nodes in persistent memory so that if the leaf fails or needs to restart for any reason, the node can determine the most recent state, and begin from that point. Different implementations may use different criteria to decide when to write checkpoints, as this can be a relatively expensive procedure. For example, each leaf server may checkpoint the states of the nodes assigned to the leaf after a predetermined number of messages have been sent or propagated. As another example, the leaf may checkpoint the states after a predetermined amount of time. Other checkpointing criteria may also be used.

If a node or a leaf server fails (e.g., does not respond), the connected component computation process need not restart. Because the messaging is asynchronous and nodes can independently checkpoint their state, each node affected by the failure may pick up where it left off. For example, after a fault a node may initialize its state to the last checkpointed state for the node (345). This checkpointed state may be stored in persistent memory, as described above. As part of the initialization process, the node may use information in the checkpoint to determine whether to set its status to active or inactive. The node may then request from its neighbors any messages sent since the time of the checkpoint (350). The node may then set its status to inactive (355) and wait for messages, as indicated by the dashed line. The neighbors that receive the recovery request may ignore the request if they have no information to send. For example the neighbor node may determine whether it sent a message since the time of the checkpoint. If it has not, the request may be ignored. If the neighbor node did send a message, and the neighbor node is inactive, the neighbor node may send its cluster identifier to the node that sent the recovery request. If the neighbor nodes status is active, the priority queue engine already includes a message for the node that sent the recovery message, so another message does not need to be sent. Once the node that sent the recovery request begins receiving messages, it may process the messages as indicated above, with regard to steps 320 through 340.

The priority queue engine may be propagating messages arbitrarily as it receives them. When the priority queue has no other messages to send, it may check the state of the nodes. If all nodes are inactive, the leaf may report that its nodes are inactive. Of course, if the priority queue receives a message from another leaf, it may report that its nodes are once again active (e.g., no longer inactive). A root node may track the status of each leaf in the distributed system. When each leaf is inactive, the clusters are stable and the system has computed the connected components for the graph. Process 300 has thus ended for all nodes in the graph and the value of the state cluster identifier for each node indicates which connected component in the graph the node belongs to. The system may store the cluster identifier from the node's state as an attribute of the node. The cluster identifier or other value sent via message can be used in various ways for additional graph processing such as suggesting new connections in a social networking graph, load distribution for traffic in a computer network graph, vision or image processing, machine learning, responding to search queries, knowledge discovery, etc. Additionally, although the process 300 is illustrated as sending a lowest identifier, it is understood that the asynchronous messaging techniques may be used with a highest identifier with appropriate modifications.

Figure 4:
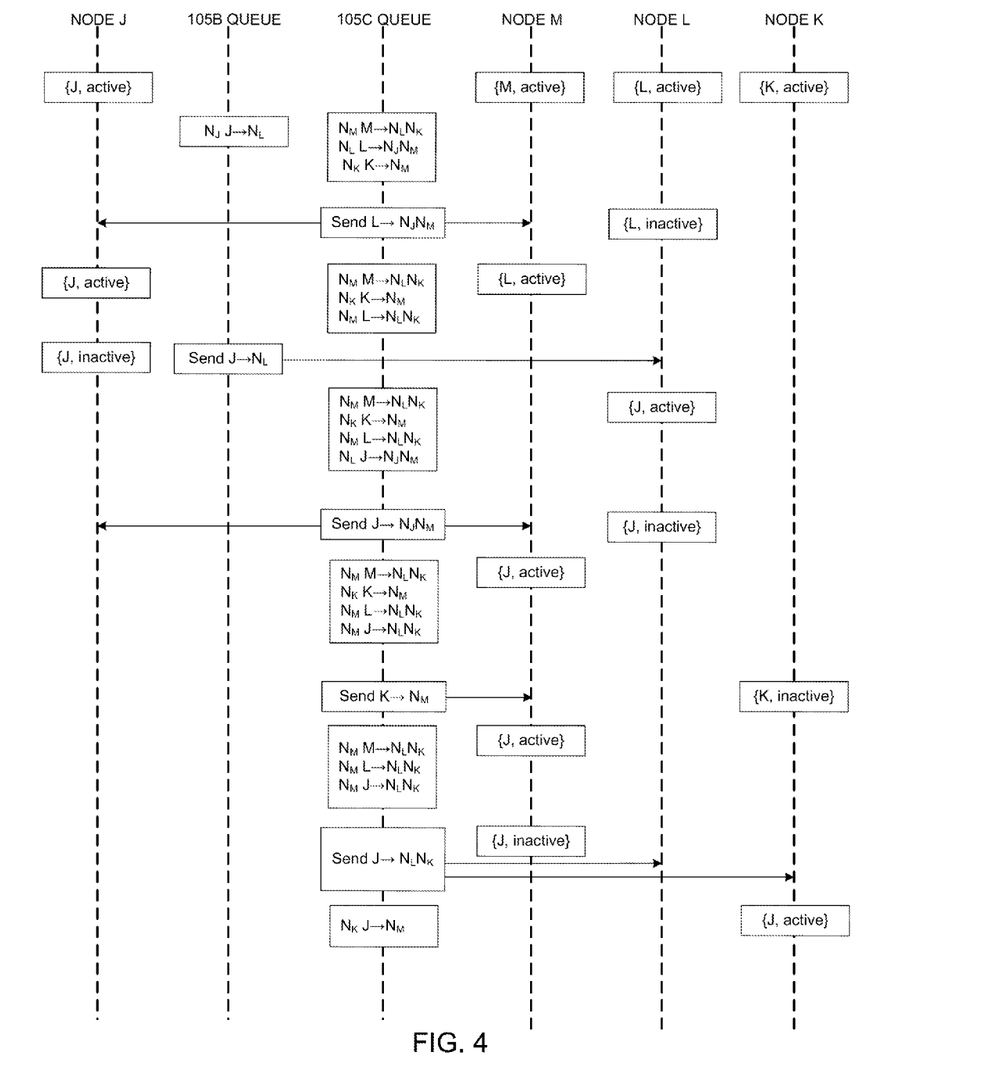
FIG. 4 illustrates an example of asynchronous message passing, in accordance with an implementation.

FIG. 4 illustrates an example of asynchronous messaging using cluster 215 of FIG. 2. While cluster 215 is used an example for brevity, it is understood that the computation of connected components would occur for all nodes of the graph simultaneously, and not just for the nodes of cluster 215. It is also understood that the representation of the states below uses alphanumeric values, e.g., {value, status}, for ease of explanation and the actual data structure implementation may use other representations that are more memory conscious. Upon initialization of the state, the nodes in cluster 215 may begin with the following states (Sv):

$S_J$={J, active}
$S_K$={K, active}
$S_L$={L, active}
$S_M$={M, active}

The identifier in each state may be propagated to its neighbors. Thus, Node J sends J to Node L, Node L sends L to Node J and Node M, Node M sends M to Node L and Node K, and Node K sends K to Node M. The messages can be sent simultaneously and independently from each other. Node J is on a different leaf than Nodes K, L, and M. Thus, the priority queue of Leaf 150B may delay sending Node J's message to Node L so it can bundle the message with other messages directed to Leaf 150C. For example, Node B may also be sending messages to Nodes D and C. These messages may be bundled with Node J's message to Node L and delivered together to the priority queue engine of Leaf 150C, thus making more efficient use of network resources.

The priority queue engine on Leaf 150C may choose to propagate Node L's messages to Nodes M and J first, leaving the messages of M to Node L, M to Node K, and K to Node M in the queue. The priority queue engine may also set the status of L to inactive. Node M receives L's message and determines that L is less than M. Thus, Node M changes its cluster identifier to L and marks itself as active. Node M then sends a message to Node L and Node K with the identifier of L. Node J also receives Node L's message, but J is less than L, so Node J takes no action.

In the meantime, the priority queue of Leaf 150B may propagate Node J's message to Node L to the priority queue of Leaf 150C, causing Node L to receive the identifier J. Because J is less than L, Node L changes its status to active, and sends a message to Node J and Node M with J as an identifier. Thus, the priority queue on Leaf 150C may have messages of M to Node L, M to Node K, K to Node M, L to Node L, L to Node K, J to Node J and J to Node M in the queue. The queue engine my propagate the messages J to Node M and J to Node J next, setting L's status to inactive. Because J is lower than L Node M's current identifier, Node M changes its status to active, changes its identifier to J and sends a message to Node L and Node K with identifier J. The priority queue engine may propagate the message K to Node M next, setting K's status to inactive. Node M does nothing because K is not less than J, M's current status. Although not discussed above in the example, the nodes may also checkpoint their state at appropriate times.

As demonstrated, the order of message propagation can be random without affecting the outcome of the computation. Because it is safe to change the order of message propagation, the priority queue engine may intelligently choose which messages to send first, so that the total number of messages sent by the system is reduced. As one example, if the system uses a smallest identifier, the priority queue engine may propagate messages that include smaller identifiers and skip messages with higher identifiers to the same nodes because the latter would be redundant. Accordingly, using the example above the queue includes three messages to Nodes K and L, one with J, one with M, and one with L. Because J is lower than both M and L, the priority queue engine may propagate the message with J but skip the messages with M and L. When the priority queue engine skips the messages sending M and L it may still change the status of Node M, which sent the message to Nodes L and K, to inactive.

Furthermore, the asynchronous message passing reduces contention and increases parallelism. The tradeoff for the ability to perform asynchronous message passing is that messages sent between two nodes must be idempotent, e.g., not alter the state of the source nor target nodes if the framework decides to resent them one or more times, and the messages must supersede all previous messages sent between the source and target nodes. In other words, the system is allowed to suppress any but the last message sent between two nodes without changing the behavior of the implemented algorithm.

The processes described above may be used with additional parameters. For example, in considering what constitutes a neighbor node, the system may consider only edges in the graph that meet certain criteria. This will, of course, result in a higher number of clusters, or connected components, for the graph. Other such parameters may be used in conjunction with this disclosure.

The asynchronous message passing framework described above may also be used with other techniques of graph analysis beyond computing connected components. For example, the asynchronous message passing framework can be used to calculate a shortest path between nodes using the priority queue engine and checkpointing. In such implementations the information included in the message sent between nodes and the operations performed at the nodes may differ from those discussed above, but the role of the priority queue engine and the fault tolerant techniques are similar.

Figure 5:
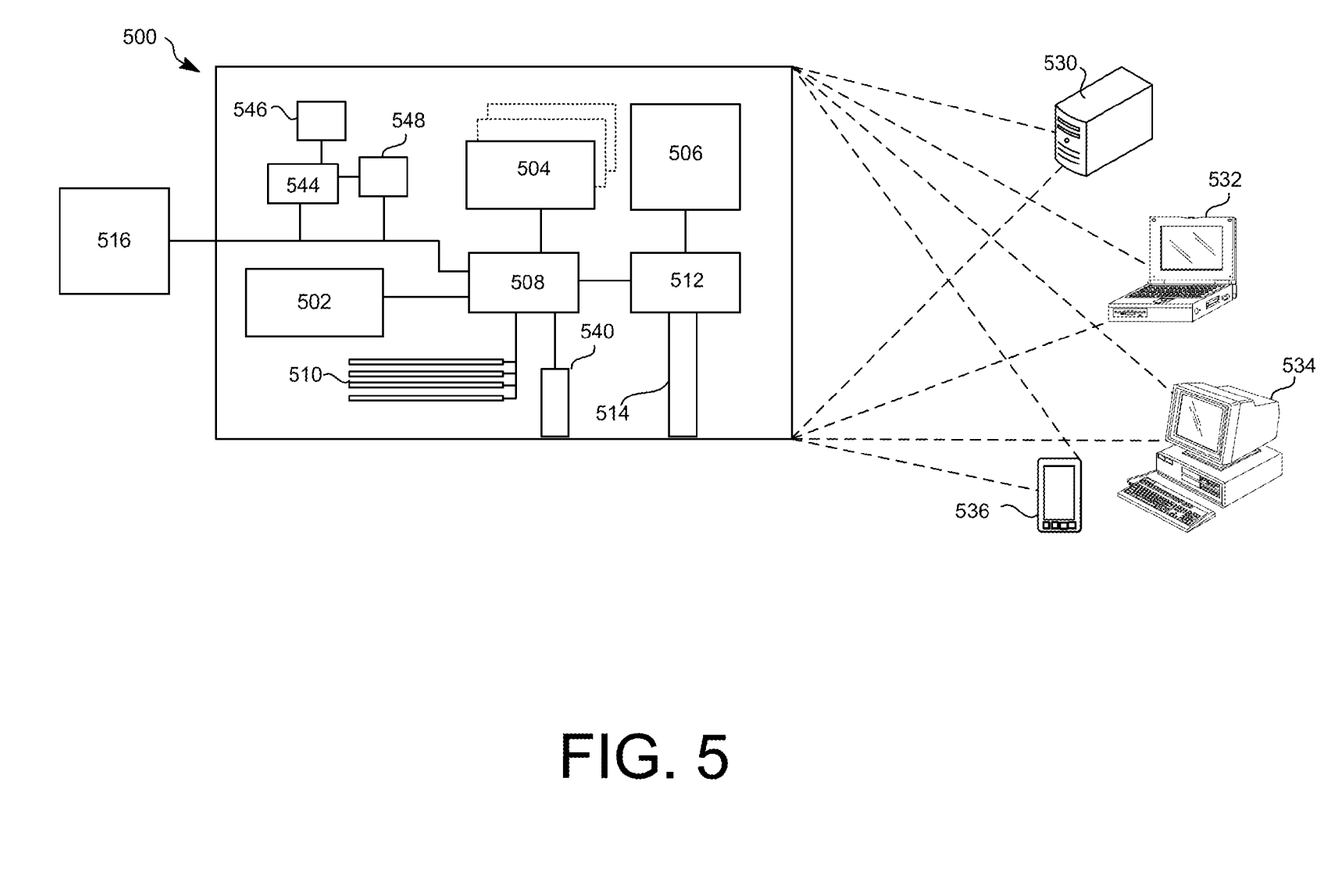
FIG. 5 shows an example of a computer device that can be used to implement the described techniques.

FIG. 5 shows an example of a generic computer device 500, which may be system 100 or client 170 of FIG. 1, which may be used with the techniques described here. Computing device 500 is intended to represent various example forms of computing devices, such as laptops, desktops, workstations, personal digital assistants, cellular telephones, smart phones, tablets, servers, and other computing devices, including wearable devices The components shown here, their connections and relationships, and their functions, are meant to be exemplary only, and are not meant to limit implementations of the inventions described and/or claimed in this document.

Computing device 500 includes a processor 502, memory 504, a storage device 506, and expansion ports 510 connected via an interface 508. In some implementations, computing device 500 may include transceiver 546, communication interface 544, and a GPS (Global Positioning System) receiver module 548, among other components, connected via interface 508. Device 500 may communicate wirelessly through communication interface 544, which may include digital signal processing circuitry where necessary. Each of the components 502, 504, 506, 508, 510, 540, 544, 546, and 548 may be mounted on a common motherboard or in other manners as appropriate.

The processor 502 can process instructions for execution within the computing device 500, including instructions stored in the memory 504 or on the storage device 506 to display graphical information for a GUI on an external input/output device, such as display 516. Display 516 may be a monitor or a flat touchscreen display. In some implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk. In some implementations, the memory 504 may include expansion memory provided through an expansion interface.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in such a computer-readable medium. The computer program product may also contain instructions that, when executed, perform one or more methods, such as those described above. The computer- or machine-readable medium is a storage device such as the memory 504, the storage device 506, or memory on processor 502.

The interface 508 may be a high speed controller that manages bandwidth-intensive operations for the computing device 500 or a low speed controller that manages lower bandwidth-intensive operations, or a combination of such controllers. An external interface 540 may be provided so as to enable near area communication of device 500 with other devices. In some implementations, controller 508 may be coupled to storage device 506 and expansion port 514. The expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 530, or multiple times in a group of such servers. It may also be implemented as part of a rack server system. In addition, it may be implemented in a personal computer such as a laptop computer 522, or smart phone 536. An entire system may be made up of multiple computing devices 500 communicating with each other. Other configurations are possible.

FIG. 6 shows an example of a generic computer device 600, which may be system 100 of FIG. 1, which may be used with the techniques described here. Computing device 600 is intended to represent various example forms of large-scale data processing devices, such as servers, blade servers, datacenters, mainframes, and other large-scale computing devices. Computing device 600 may be a distributed system having multiple processors, possibly including network attached storage nodes, that are interconnected by one or more communication networks. The components shown here, their connections and relationships, and their functions, are meant to be exemplary only, and are not meant to limit implementations of the inventions described and/or claimed in this document.

Distributed computing system 600 may include any number of computing devices 680. Computing devices 680 may include a server or rack servers, mainframes, etc. communicating over a local or wide-area network, dedicated optical links, modems, bridges, routers, switches, wired or wireless networks, etc.

In some implementations, each computing device may include multiple racks. For example, computing device 680a includes multiple racks 658a-658n. Each rack may include one or more processors, such as processors 652a-652n and 662a-662n. The processors may include data processors, network attached storage devices, and other computer controlled devices. In some implementations, one processor may operate as a master processor and control the scheduling and data distribution tasks. Processors may be interconnected through one or more rack switches 658, and one or more racks may be connected through switch 678. Switch 678 may handle communications between multiple connected computing devices 600.

Each rack may include memory, such as memory 654 and memory 664, and storage, such as 656 and 666. Storage 656 and 666 may provide mass storage and may include volatile or non-volatile storage, such as network-attached disks, floppy disks, hard disks, optical disks, tapes, flash memory or other similar solid state memory devices, or an array of devices, including devices in a storage area network or other configurations. Storage 656 or 666 may be shared between multiple processors, multiple racks, or multiple computing devices and may include a computer-readable medium storing instructions executable by one or more of the processors. Memory 654 and 664 may include, e.g., volatile memory unit or units, a non-volatile memory unit or units, and/or other forms of computer-readable media, such as a magnetic or optical disks, flash memory, cache, Random Access Memory (RAM), Read Only Memory (ROM), and combinations thereof. Memory, such as memory 654 may also be shared between processors 652a-652n. Data structures, such as an index, may be stored, for example, across storage 656 and memory 654. Computing device 600 may include other components not shown, such as controllers, buses, input/output devices, communications modules, etc.

An entire system, such as system 100, may be made up of multiple computing devices 600 communicating with each other. For example, device 680a may communicate with devices 680b, 680c, and 680d, and these may collectively be known as system 100. As another example, system 100 of FIG. 1 may include one or more computing devices 600 as root 120 and one or more of leaves 150, a separate computing device 600 as root 120, and one or more computing devices 600 as graph cluster 160. Furthermore, some of the computing devices may be located geographically close to each other, and others may be located geographically distant. The layout of system 600 is an example only and the system may take on other layouts or configurations.

Various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any non-transitory computer program product, apparatus and/or device (e.g., magnetic discs, optical disks, memory (including Read Access Memory), Programmable Logic Devices (PLDs)) used to provide machine instructions and/or data to a programmable processor but not to transitory signals.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A system comprising:
   distributed computing devices represented by leaf servers; and
   memory storing a graph of nodes and edges, the graph being distributed across the leaf servers,
   wherein a leaf server includes:
   a priority queue engine that propagates messages between neighboring nodes in an intelligent manner that includes bundling together messages directed to nodes on another leaf server before the propagation of the messages and skipping redundant messages rather than propagating the redundant messages, memory storing a cluster identifier for each node assigned to the leaf server, at least one processor, and memory storing instructions that, when executed by the at least one processor, cause the leaf server to send asynchronous messages between neighboring nodes via the priority queue engine, the messages including a cluster identifier for a first node, wherein sending the asynchronous message is triggered when the first node updates its cluster identifier after receiving the cluster identifier from another node.

2. The system of claim 1 wherein the memory further stores instructions that, when executed by the at least one processor, cause the leaf server to:

propagate the message to a second node;

compare the cluster identifier from the message with the cluster identifier for the second node to determine whether to update the cluster identifier for the second node; and when it is determined that the cluster identifier of the second node is to be updated:

update the cluster identifier for the second node with the cluster identifier from the message, and generate messages to neighboring nodes of the second node, the messages including the updated cluster identifier.

3. The system of claim 2 wherein memory further stores instructions that, when executed by the at least one processor, cause the leaf server to:

set a status of the second node to active as part of the updating.

4. The system of claim 3 wherein the memory further stores instructions that, when executed by the at least one processor, cause the leaf server to:

set the status of the second node to inactive in response to propagation of the messages to neighboring nodes.

5. The system of claim 2 wherein the memory further stores instructions that, when executed by the at least one processor, cause the leaf server to:

store the updated cluster identifier in persistent memory.

6. The system of claim 1, wherein an initial value for the cluster identifier of a node is the node identifier.

7. The system of claim 1, wherein redundant messages include messages having a cluster identifier that would be updated by a cluster identifier in another message.

8. The system of claim 2 wherein the cluster identifier represents the smallest identifier seen by the first node and the cluster identifier for the second node is to be updated when the cluster identifier from the message is smaller than the cluster identifier for the second node.

9. The system of claim 1 wherein the graph includes more than one billion nodes.

10. The system of claim 1, wherein at least one leaf server includes a plurality of processors and the at least one leaf server uses the plurality of processors to concurrently send multiple messages departing from nodes and to receive multiple messages arriving at nodes.

11. A computer-implemented method comprising:

propagating, using at least one processor, messages sent between nodes in a distributed graph in an intelligently asynchronous manner that includes bundling together messages directed to nodes on another leaf server before the propagation of the messages and skipping redundant messages rather than propagating the redundant messages, the messages including respective cluster identifiers, wherein a priority queue engine controls the propagating; and in response to a first node of the distributed graph receiving one of the messages:

comparing, using the at least one processor, a cluster identifier from the received message with a cluster identifier for the first node to determine whether to update the cluster identifier for the first node, and when it is determined that the cluster identifier of the first node is to be updated:

updating the cluster identifier for the first node with the cluster identifier from the message, and sending messages to neighboring nodes of the first node via the priority queue, the messages including the updated cluster identifier.

12. The method of claim 11 wherein redundant messages include messages having a cluster identifier that would be updated by a cluster identifier in another message.

13. The method of claim 11 wherein the priority queue engine propagates the messages in an arbitrary manner rather than a first-in-first-out or last-in-last-out manner.

14. The method of claim 11 wherein nodes in the distributed graph are assigned to one of a plurality of leaf servers with each leaf server having a respective priority queue engine, the priority queue engine being one of the respective priority queue engines, and wherein the priority queue engine bundles messages directed to nodes assigned to a remote leaf server of the plurality of leaf servers prior to propagating the messages.

15. The method of claim 14 wherein propagating the messages at a particular leaf server continues despite a failure of another leaf server.

16. The method of claim 11 further comprising storing the updated cluster identifier in persistent memory.

17. The method of claim 16, further comprising, in response to the first node determining that it experienced a failure:

obtaining the cluster identifier from the persistent memory; and generating messages to the neighboring nodes of the first node, the messages requesting a cluster identifier from the respective neighboring nodes.

18. The method of claim 17 wherein the cluster identifier for the first node represents the smallest identifier seen by the first node and the cluster identifier for the first node is to be updated when the cluster identifier from the message is smaller than the cluster identifier for the first node.

19. The method of claim 11 further comprising:

setting a status of the first node to active as part of the updating.

20. The method of claim 19 further comprising:

setting the status of the first node to inactive in response to propagation of the messages to the neighboring nodes.

21. The method of claim 11, wherein the propagating is performed without regard to respective states of the nodes in the distributed graph.

22. A computer-implemented method comprising:

receiving, using at least one processor, at a node in a distributed graph, a message with a first value;

determining, at the node, that the first value replaces a current value for the node;

responsive to the determining, setting a status of the node to active and sending messages that include the first value to neighboring nodes; and receiving, using the at least one processor, the messages to the neighboring nodes at a priority queue, wherein the priority queue propagates messages in an intelligently asynchronous manner that includes bundling together messages directed to nodes on another leaf server before the propagation of the messages and skipping redundant messages rather than propagating the redundant messages, and wherein responsive to the message being propagated to the neighboring nodes, the status of the node is set to inactive.

23. The method of claim 22, wherein the node is a first node and the method further comprises:

receiving, at the first node, a request from a second node for messages sent after a first time;

determining, at the first node, whether the messages to neighboring nodes were sent after the first time;

when the messages were sent after the first time, re-sending the message to the second node; and when the messages were not sent after the first time, ignoring the request.

24. The method of claim 23, wherein the second node sends the request after recovering a current value for the second node from a checkpoint.

25. The method of claim 22, wherein the first value and the current value are cluster identifiers.

26. The method of claim 22, wherein the first value and the current value are shortest path identifiers.

* * * * *

UNITED STATES PATENT AND TRADEMARK OFFICE
CERTIFICATE OF CORRECTION

PATENT NO.         : 9,852,230 B2
APPLICATION NO.    : 14/145127
DATED              : December 26, 2017
INVENTOR(S)        : Fleury et al.

Page 1 of 1

It is certified that error appears in the above-identified patent and that said Letters Patent is hereby corrected as shown below:

In the Claims

In Column 13, Line 14, Claim 2, delete "claim 1" and insert --claim 1,-- therefor.

In Column 13, Line 30, Claim 3, delete "claim 2 wherein" and insert --claim 2, wherein the-- therefor.

In Column 13, Line 35, Claim 4, delete "claim 3" and insert --claim 3,-- therefor.

In Column 13, Line 40, Claim 5, delete "claim 2" and insert --claim 2,-- therefor.

In Column 13, Line 49, Claim 8, delete "claim 2" and insert --claim 2,-- therefor.

In Column 13, Line 54, Claim 9, delete "claim 1" and insert --claim 1,-- therefor.

In Column 14, Line 18, Claim 12, delete "claim 11" and insert --claim 11,-- therefor.

In Column 14, Line 21, Claim 13, delete "claim 11" and insert --claim 11,-- therefor.

In Column 14, Line 24, Claim 14, delete "claim 11" and insert --claim 11,-- therefor.

In Column 14, Line 32, Claim 15, delete "claim 14" and insert --claim 14,-- therefor.

In Column 14, Line 35, Claim 16, delete "claim 11" and insert --claim 11,-- therefor.

In Column 14, Line 45, Claim 18, delete "claim 17" and insert --claim 17,-- therefor.

In Column 14, Line 50, Claim 19, delete "claim 11" and insert --claim 11,-- therefor.

In Column 14, Line 53, Claim 20, delete "claim 19" and insert --claim 19,-- therefor.

Signed and Sealed this
Sixth Day of November, 2018

Andrei Iancu
*Director of the United States Patent and Trademark Office*